CIRCUIT ARRANGEMENT TO PRODUCE A SAWTOOTH CURRENT IN A COIL AND A DIRECT VOLTAGE

Filed Feb. 16, 1959 2 Sheets-Sheet 1

INVENTOR
PETER JOHANNES HUBERTUS JANSSEN
ANTONIUS BOEKHORST
WOUTER SMEULERS
BY
AGENT

Oct. 30, 1962 P. J. H. JANSSEN ETAL 3,061,757

CIRCUIT ARRANGEMENT TO PRODUCE A SAWTOOTH CURRENT IN A COIL AND A DIRECT VOLTAGE

Filed Feb. 16, 1959 2 Sheets-Sheet 2

INVENTOR
PETER JOHANNES HUBERTUS JANSSEN
ANTONIUS BOEKHORST
WOUTER SMEULERS
BY Frank R. Jifari
AGENT

United States Patent Office 3,061,757

Patented Oct. 30, 1962

3,061,757

CIRCUIT ARRANGEMENT TO PRODUCE A SAW-TOOTH CURRENT IN A COIL AND A DIRECT VOLTAGE

Peter Johannes Hubertus Janssen, Antonius Boekhorst, and Wouter Smeulers, Eindhoven, Netherlands, assignors to North American Philips Company, Inc., New York, N.Y., a corporation of Delaware Filed Feb. 16, 1959, Ser. No. 793,483
Claims priority, application Netherlands Feb. 15, 1958
8 Claims. (Cl. 315—27)

Figures 1, 2:
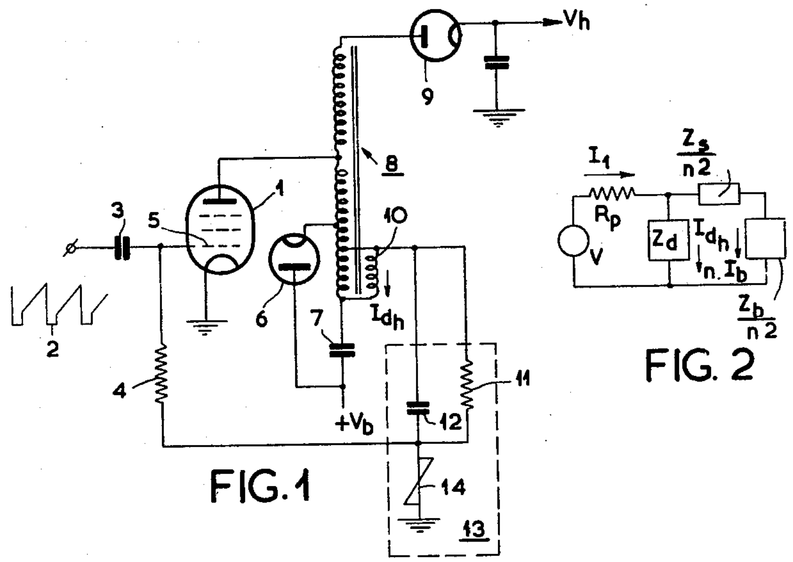

The invention relates to a circuit arrangement for producing a sawtooth current in a coil and a direct voltage with the aid of an amplifiying element, to which a signal is fed, which releases periodically the said element, the output circuit of the arrangement including a transformer, of which the primary winding, with which the coil is coupled, is connected at one end, if desired via a capacitor, to one terminal of a voltage source, the other terminal of which is connected to the amplifying element, whilst the other terminal of the primary winding is connected to the output terminal of the amplifying element and the pulses produced across this primary winding during the fly-back of the sawtooth current are rectified subsequent to a step-up by a secondary winding on the transformer.

Such circuit arrangements are employed, inter alia, in television receivers, in which the sawtooth current passing through the coil produces a field which deflects the electron beam in the picture tube in the horizontal direction and in which the rectified voltage is fed to the final anode of the picture tube.

If variations occur, for example due to variations in the current across the picture tube, not only the rectified voltage to feed the final anode of the picture tube will vary, but also the current through the deflection coils, since these two magnitudes mutually effect each other via the transformer.

Numerous circuit arrangements are known, which tend to keep the deflection current as constant as possible, by negative feed-back, in which case, however, the voltage for the final anode varies owing to the ever-occurring stray inductance in the transformer. Other circuits tend to minimize the high-voltage variations, by negative feed-back, in which case, however, for the same reason as stated above, the deflection current did not remain constant.

However, there must be a fixed relationship between deflection current and high-voltage, if a constant deflection of the electron beam is to be ensured. If one of the two factors varies, also the deflection will vary, so that if only one of the two factors is kept constant, at the said variation of the load current, also the dimensions of the reproduced picture will vary.

The circuit arrangement according to the invention is based on the recognition of the fact that, since it is impossible to keep constant both the deflection current and the voltage for feeding the final anode of the picture tube it is desirable to vary the two factors so that in spite of variations of the two magnitudes, prior to and after the variation, an unambiguous relationship is maintained between them.

The circuit arrangement according to the invention is therefore characterized in that provision is made of means which, in the event of variations, particularly of variations in the load of the direct voltage produced, cause the amplitude of the sawtooth current and the direct voltage produced to vary accordingly in a manner such that, within the range of operation, the relative variation in the said amplitude is about half the relative variation of the said direct voltage.

A few possible embodiments of the circuit arangement according to the invention will be described with reference to the drawings.

FIG. 1 shows a first embodiment of the arrangement according to the invention, in which the negative feed-back circuit employed compensates only partly the potential variations in the deflection current.

Figure 3:
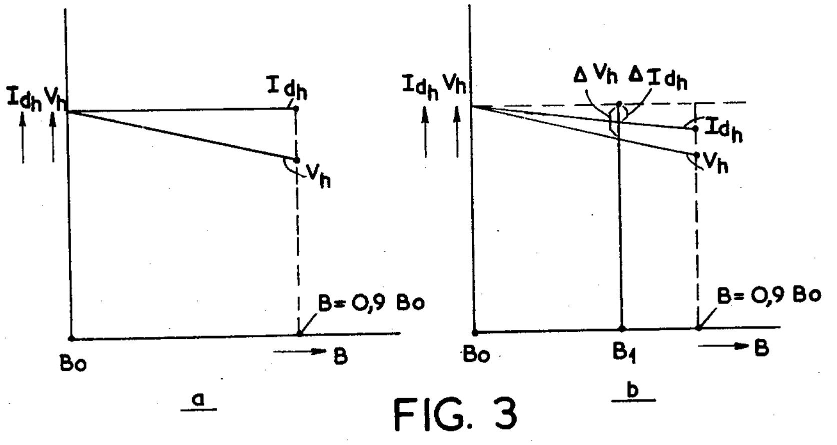
Figure 4:
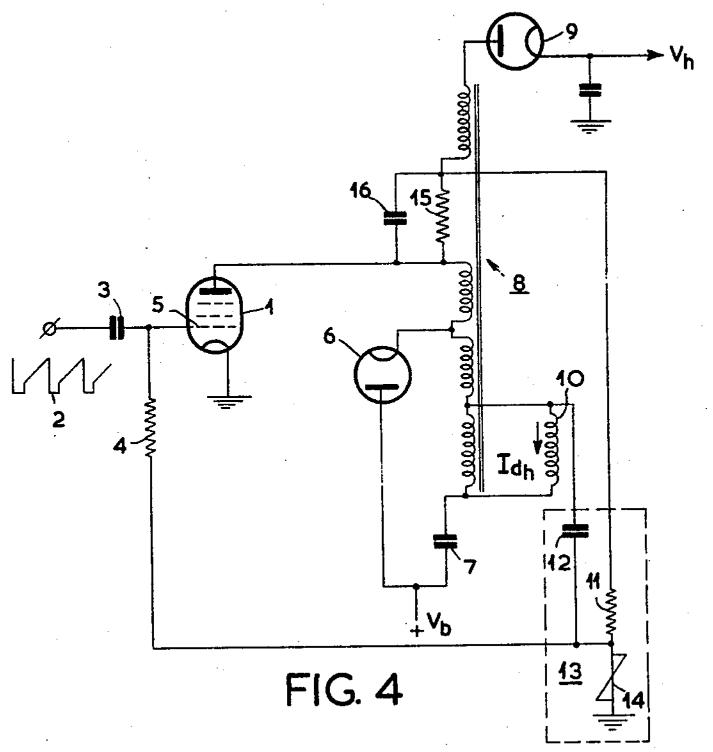
Figure 5:
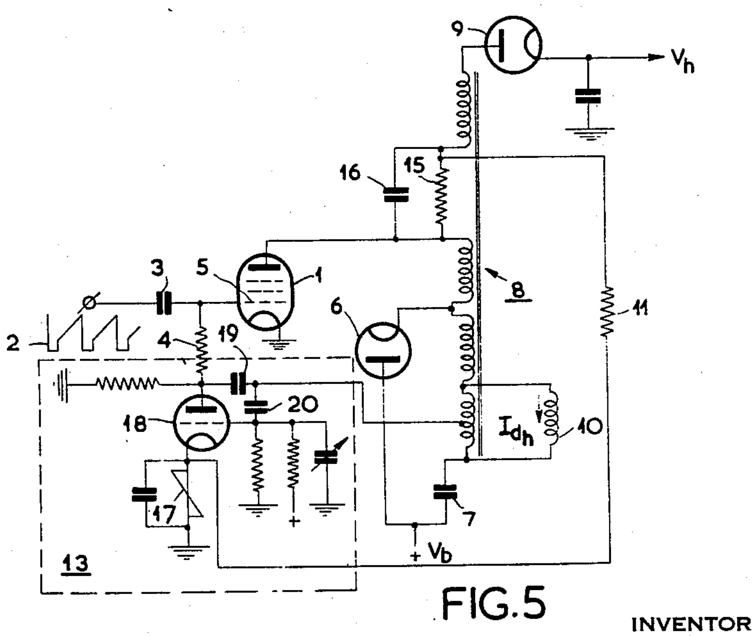

FIGS. 2 and 3 serve for further explanation and FIGS. 4 and 5 show further embodiments of the arrangement according to the invention.

Referring to FIG. 1, a control-voltage 2 is fed via a capacitor 3 and a leakage resistor 4 to the control-grid 5 of a tube 1, which is periodically released by this control-voltage. The tube 1 is the output tube of the horizontal-deflection circuit and the anode current produced by tube 1 passes through the primary winding of the transformer 8 and, with the aid of the booster diode 6, it produces through the coil 10, a sawtooth current with an amplitude $I_{dh}$. The lower end of the primary winding is connected, via the capacitor 7, associated with the booster diode circuit, to the positive terminal of a voltage source (not shown), of which the negative terminal is connected to earth and which provides a voltage $V_b$. The anode of the diode 6 is also connected to the positive terminal of this voltage source.

The pulses produced across the primary winding of the transformer 8 during the fly-back of the sawtooth current are stepped up via the secondary winding and rectified by the rectifier 9, so that, subsequent to smoothing, a direct voltage $V_h$ is obtained, which is used to feed the final anode of the picture tube.

The coil 10 surrounds the neck of the picture tube (not shown) and the current passing through the coil 10 produces a magnetic field, which deflects the electron beam in the horizontal direction.

For a given extent of deflection *d* of the electron beam on the screen of the picture tube and with a voltage $V_h$, the deflection current must, in general, fulfil the condition.

$$i_d = K\sqrt{V_h} \qquad (1)$$

wherein $i_d$ is the instaneous value of the sawtooth current, $V_h$ the acceleration voltage of the electrons and K a proportionality constant, which varies with the extent of deflection *d* and the tube constants.

For the sake of simplicity the following considerations are based on an amplitude $I_d$ of the sawtooth current producing a complete deflection D of the electron beam on the screen. $I_d$ being the amplitude of the current, D designates half the height of the picture, when $I_{dv}$ is the amplitude of the current passing through the *v* vertical-deflection coils, or D is half the width of the picture, when $I_{dh}$ is the amplitude of the current passing through the horizontal deflection coils. Since the current varies substantially linearly with time, a variation in $I_d$ will entail a corresponding variation of the deflection at a variation in $i_d$.

The arrangement shown in FIG. 1 comprises furthermore a control circuit 13, consisting of a capacitor 12, which supplies the alternating voltage from a tapping of the primary winding of the transformer to the element 14, which has a non-linear current-voltage characteristic curve, and of a resistance element 11, which provides the direct-current connection between the said tapping and the element 14. Thus the element 11 furnishes, so to say, a positive bias votlage for the element 14, across which a negative voltage is produced, in the case of an adequate amplitude of the pulses produced across the primary winding of the transformer 8. This voltage being stored by the capacitor 12 for that part of the period for which the pulses are not operative. The negative voltage thus obtained is supplied via the leakage resistor 4 to the control-grid 5.

The element 14 may be constituted by a voltage-dependent resistor (VDR-resistor); in this embodiment the tapping to which the elements 11 and 12 are connected is the same as that to which one end of the coil 10 is connected, but this is not at all required in all cases. The tapping may comprise a greater or smaller number of turns of the primary winding of the transformer 8 in accordance with the amplitude of the pulses to be fed to the element 14.

It will be obvious that the tapping may also be provided on the secondary winding of the transformer 8. However, in this case the variations in $V_h$ instead of those in $I_{dh}$ are reduced. It follows from (1) that if the control-circuit 13 would be used to keep strictly constant either $I_{dh}$ or $V_h$, the extent of deflection $D_h$ in the horizontal direction on the screen would vary, since the conditions of (1) are no longer fulfilled owing to the residual variation of one of the two magnitudes.

The foregoing will be explained with reference to FIG. 2, which shows an equivalent diagram of the arrangement shown in FIG. 1. In this figure $Z_b/n^2$, $Z_s/n^2$ and $I_b.n$ designate the high-voltage load transferred to the primary of the transformer 8 (picture tube plus circuit elements), the impedance between primary and secondary (mainly the stray inductance of the transformer 8) and the current passing through the picture tube respectively.

$Z_d$ is the total impedance constituted by the deflection circuit and $I_{dh}$ is the amplitude of the said deflection current, whilst $R_p$ is the primary internal resistance constituted by the tube 1, the diode 6 and the primary winding of the transformer 8. The voltage V indicates the electro-motive force produced by the tube 1 and causing a total current $I_1 = I_{dh} + n.I_b$ to pass through the circuit, whilst $n$ designates the ratio between the secondary and the primary windings.

If $$Z_s/n^2 = Z'_s,\ Z_b/n^2 = Z'_b \text{ and } n.I_b = I'_b$$

it follows from FIG. 2 that:

$$Z_d.I_{dh} = (Z'_s + Z'_b)I'_b \quad (2)$$

or $$Z_d.I_{dh} = Z'_s.I'_b + V'_h$$

wherein $V'_h = Z'_b.I'_b$ = the high voltage $V'_h = V_h/n$ transferred to the primary side.

If $I'_b$ varies, since $Z'_b$ varies, for example owing to variation in image brightness, and if $I_{dh}$ is kept constant, it applies that:

$$Z_d.I_{dh} - Z'_s.I'_b = V'_h \quad (3)$$

This means $V'_h$ varies, since $Z'_s$ and $Z_d$ are constant and it follows therefrom that (1) is not fulfilled.

If, on the contrary, $V'_h$ is kept constant, it follows from the foregoing formula that $I_{dh}$ must vary.

The first case is illustrated in FIG. 3*a*, in which the deflection current $I_{dh}$ and the high voltage $V_h$ are indicated as a function of the load B (variation in the current through the picture tube). If $B_0$ designates the minimum load and if, at this load, the equation (1) is fulfilled, it will be evident that this does not apply to any other load.

(In FIGS. 3*a* and 3*b* $I_{dh}$ and $V_h$ at $B = B_0$ are indicated with the same value in order to give prominence to the variation of one of them or of both relative to each other. It will be obvious that their absolute values are different.)

In the second case (not shown) the line for $V_h$ is horizontal and the line for $I_{dh}$ is directed obliquely upwards, so that it follows therefrom that only if $B = B_0$ the Equation 1 is fulfilled.

In accordance with the invention the desired result is obtained by causing the two magnitudes to vary simultaneously, as is illustrated in FIG. 3*b*.

For $$B = B_0$$

it follows from (1):

$$I_{dh} = K\sqrt{V_h} \quad (1a)$$

and for $B = B_1$ it then applies:

$$I_{dh} + \Delta I_{dh} = K\sqrt{V_h + \Delta V_h} \quad (4)$$

or $$I_{dh}(1 + \Delta I_{dh}/I_{dh}) = K\sqrt{V_h}.\sqrt{1 + \Delta V_h/V_h} = K\sqrt{V_h}(1 + \tfrac{1}{2}\Delta V_h/V_h) - \tfrac{1}{8}(\Delta V_h/V_h)^2 + \tfrac{1}{16}(\Delta V_h/V_h)^3$$

Since always small variations are to be taken into account (variations of about 10% in load, i.e. B varies between $B_0$ and 0.9 $B_0$), the last-mentioned formula for the operative range concerned may be simplified, with a certain approximation, into:

$$I_{dh}(1 + \Delta I_{dh}/I_{dh} = K\sqrt{V_h}(1 + \tfrac{1}{2}\Delta V_h/V_h \quad (5)$$

Since (1*a*) is always valid, Equation 5 will be fulfilled, if:

$$\Delta I_{dh}/I_{dh} = \tfrac{1}{2}\Delta V_h/V_h \quad (6)$$

This can be fulfilled in the following manner.

From FIG. 2 it follows for the current $I_{dh}$:

$$I_{dh} = \frac{Z'_s + Z'_b}{R_p Z_d + (Z_s + Z'_b)(R_p + Z_d)} \cdot V \quad (7)$$

and for the transformed $V'_h$:

$$V'_h = \frac{Z'_b.Z_d}{R_p.Z_d + (Z'_s + Z'_b)(R_p + Z_d)} \cdot V \quad (8)$$

By differentiating and transformation it is found:

$$\Delta I_{dh}/I_{dh} \approx dI_{dh}/I_{dh} = \frac{R_p.Z_d}{(Z'_s + Z'_b).\{R_p Z_d + (Z'_s + Z'_b)(R_p + Z_d)\}} \cdot dZb$$

and $$\Delta V_h/V_h \approx dV_h/V_h = \frac{R_p Z_d + Z'_s(R_p + Z_d)}{Z'_b\{R_p Z_d + (Z'_s + Z'_b)(R_p + Z_d)\}} \cdot dZb$$

If the values thus found are introduced into (6), we find the condition which is to be fulfilled by the various elements to provide, in the events of a variation in load, that the dimensions of the image do not vary in the horizontal direction.

After transformation we find:

$$R_p Z_d = \frac{R_p Z_d Z'_s}{Z'_b} + \frac{Z'^2_s(R_p + Z_d)}{Z'_b} + Z'_s(R_p + Z_d)$$

Since $Z'_b$ is very high with respect to the further elements (for the normal picture tube it applies that $$I_b = 100 \text{ to } 200\ \mu A \text{ at } V_h = 16\ kV)$$

we may write with a certain approximation $$R_p Z_d/(R_p + Z_d) = Z'_s = Z_s/n^2 \quad (9)$$

In other words, the transformed internal impedance on the secondary side must be equal to the parallel combination of inner resistance on the primary side and the total impedance of the deflection system.

The purpose aimed at may therefore be attained by proportioning the control-circuit of FIG. 1 so that the $I_{dh}$, with an increase of the load of the high voltage is not kept completely constant, but decreases slightly as is indicated in FIG. 3*b*. In contradistinction to those arrangements in which no control-circuit at all is provided, it is thus ensured that $R_p$ is materially reduced, whereas the negative feed-back with respect to such load variations must not be so strong that $R_p$ becomes substantially zero, as is the case in FIG. 3*a*. It will be obvious that the control-circuit 13 is not absolutely required. The value of $R_p$, however, is in this case so high that the condition according to (9) can be fulfilled only with difficulty, whereas the approximation, for which it was assumed that $Z'_b$ is high with respect to the further elements, is too coarse.

With the $R_p$ value thus obtained is associated a transformer which is proportioned so that (9) is fulfilled. This comes substantially down so that the impedance of the stray inductance, divided by the square of the transformation ratio must be equal to the said parallel combination.

Since $I_{dh}$ varies, the direct voltage across the capacitor 7 will also vary. If this voltage is designated by $V_c$, provision may be made that upon variation of $I_{dh}$ it obtains that:

$$\Delta V_c/V_c=K_1.\Delta I_{dh}/I_{dh} \qquad (10)$$

wherein $K_1$ is a proportionality constant.

If from the voltage $V_c$ is derived the control-voltage for the final tube of the vertical deflection circuit or if $(V_c+V_b)$ is utilized for feeding the last-mentioned final tube, provision may be made that $$\Delta I_{dh}/I_{dh}=K_2.\Delta I_{dv}/I_{dv}$$

so that also for the vertical deflection the condition:

$$\Delta I_{dv}/I_{dv}=\tfrac{1}{2}\Delta V_h/V_h \qquad (6a)$$

is fulfilled, and neither the dimensions in the vertical sense nor those in the horizontal sense will vary upon a variation in the load.

If the voltage $V_c$ is not available or if it is difficult to employ it for circuit-technical reasons, a separate rectification of the pulses obtained from the transformer may provide a direct voltage, which, upon a variation in $I_{dh}$, will vary in the manner indicated by the Equation 10. By using this voltage in the same manner as the voltage $V_c$, the condition (6*a*) can again be fulfilled.

A further method of obtaining the said purpose is illustrated in FIG. 4. In this figure, in which corresponding parts are designated by the same reference numerals, as far as possible, the elements 16 and 15 are provided between the primary and the secondary winding of the transformer 8. The windings remain in magnetic contact with each other via the core of the transformer. The resistor 15 constitutes the direct-current path and is traversed by the load current. The capacitor 16 provides the alternating-current coupling and constitutes an easy path for the fly back pulses. The resistor 11, which provides the direct-current adjustment of the element 14, is connected to the junction of the resistor 15 and one end of the secondary winding of the transformer 8.

If the load increases, i.e. if $I_b$ increases, the value of $V_h$ drops and thus also the voltage at the junction of the resistors 15 and 11. Thus the positive bias voltage of the element 14 drops and in spite of the fact that also the value of $I_{dh}$ has slightly decreased, a higher negative voltage will be produced owing to the non-linear current-voltage characteristic curve of the said element, so that the desired decrease of $I_{dh}$ is obtained. Whereas in the first example a small variation of $I_{dh}$ is permitted, to which the variation of $V_h$ is adapted, a variation of $V_h$ is permitted in the second example, to which the variation of $I_{dh}$ is adapted. Also in the second example the voltage $V_c$ may serve for feeding the vertical deflection circuit, so that also in this case the condition (6*a*) can be fulfilled.

The arrangement shown in FIG. 5 operates on the same principle as the arrangement shown in FIG. 4. Only the control-circuit 13 is modified and consists of an amplifying tube 18, to which the pulses of the tapping of the transformer 8 are fed via the capacitors 19 and 20. The bias voltage for this tube is obtained with the aid of an element 17, which as the element 14, has a non-linear current voltage characteristic curve and which is connected at one end to earth and at the other to the resistor 11. Also in this case the bias voltage is varied in accordance with the load current, so that the negative voltage produced by the amplifying tube 18 decreases, when the load current decreases and increases, when the load current increases, so that also here the condition of Formula 6 and, if desired that of Formula 6*a* can be fulfilled. The information regarding the variations in $V_h$ owing to load variations may also be obtained directly from the high-voltage circuit by connecting the cathode of the rectifier 9 via a suitable potentiometer to the element 14 of FIG. 4 or to the cathode of the tube 18 of FIG. 5.

In the examples shown in FIGS. 4 and 5 the transformer need not be proportioned in accordance with Formula 9, but it will be obvious that by a correct proportioning of the total control-circuit the apparent primary internal impedance $R_p$ and the apparent secondary impedance $Z_s/n^2$ are readjusted so that again Formula 9 is fulfilled. Since the two lastmentioned arrangements are pure control-circuits, a correct proportioning in capable of ensuring that, if $Z_b$ remains constant, the variations due to a variation in the supply voltage or to ageing of the elements 1 and 6 are readjusted as far as possible. This may be obtained by keeping $I_{dh}$ substantially constant with the aid of the information obtained from the primary winding of the transformer. Since the $Z_b$ value has remained constant, $V_h$ will not vary, neither the deflection of the electron beam. Since neither $V_h$ nor $Z_b$ vary, the voltage supplied to the control-circuit via the resistor 11 will remain constant, so that in this case no additional variations will occur in the control-circuit.

It will be obvious that the discharge tube 1 may be replaced by a power transistor. The diodes 6 and 9 may be constituted by any suitable unilaterally conductive element.

It is finally also possible to proportion the transformer in accordance with the Formula 9, but the information for the control-circuit 13 will not be obtained from the primary winding but from the secondary winding. This means that the required variation of $V_h$ is admitted and that, owing to the correct proportioning of the transformer, the variation in the deflection current is automatically adapted thereto.

What is claimed is:

1. A circuit for producing a direct voltage and a current with a sawtooth wave form in a coil comprising an amplifying element having an input and output circuit, means applying a signal to said input circuit for periodically rendering said amplifying device conductive, said output circuit comprising a transformer having a primary and secondary winding, means connecting said coil to an end of said primary winding, means connecting one end of said primary winding to a source of voltage and the other end of said primary winding to an output electrode of said amplifying device, rectifier means connected to one end of said secondary winding for producing a direct voltage, and means for effecting variation of the amplitude of said sawtooth current with variation of said direct voltage such that the relative variation of said amplitude is approximately half of the relative variation of said direct voltage, the internal resistance $R_p$ of said amplifying element, the impedance $Z_d$ of said coil transferred to said other end of said primary winding, and the internal impedance $Z_s/n^2$ of the secondary side of said transformer transferred to the primary side, being related as follows $$\frac{Z_d R_p}{Z_d+R_p}=\frac{Z_s}{n^2}$$

where $n$ is the transformation ratio of said transformer.

2. A circuit for producing a direct voltage and a current with a sawtooth wave form in a coil comprising an amplifying element having an input and output circuit, means applying a signal to said input circuit for periodically rendering said amplifying device conductive, said output circuit comprising a transformer having a primary and secondary winding, means connecting said coil to an end of said primary winding, means connecting one end of said primary winding to a source of voltage and the other end of said primary winding to an output electrode of said amplifying device, rectifier means connected to one end of said secondary winding for producing a direct voltage, and means for effecting variation of the amplitude of said sawtooth current with variation of said direct voltage such that the relative variation of said amplitude is approximately half of the relative variation of said direct voltage, a control circuit having a first input terminal coupled to said primary winding, a second input terminal, and an output circuit connected to the input circuit of said amplifying element, and means connected to said secondary winding applying a voltage to said second input terminal that varies with the load on the produced direct voltage, said control circuit comprising a negative feedback circuit for information supplied to said first input terminal and a positive feedback circuit for information supplied to said second input terminal.

3. The circuit of claim 2, in which said amplifying element comprises a discharge tube, comprising means applying said signal to the control grid of said tube, and means connecting said one end of said primary winding to the positive terminal of said voltage source by way of a capacitor, said output electrode comprising the anode of said tube.

4. The circuit of claim 3, in which said control circuit comprises a second biased discharge tube, said first input terminal comprising, means connecting the control grid and anode of said second tube by way of separate capacitor means to a tap on said transformer, an impedance element connected between the anode of said second tube and the control grid of said first tube, and said second input terminal being connected to the cathode of said second tube to provide a bias for said second tube that varies with the load on said produced direct voltage.

5. The circuit of claim 3, in which said control circuit comprises a device having a non-linear voltage current characteristic curve, means connecting one end of said element to the negative terminal of said voltage source, means connecting the other end of said device to said grid of said tube, a network connected between the other end of said secondary winding and said other end of said primary winding, said second input terminal comprising resistance means connecting said other end of said secondary winding to said other end of said device, and said first input terminal comprising capacitor means connected between said other end of said device and a tap on said primary winding.

6. The circuit of claim 5, in which said device comprises a voltage dependent resistor.

7. The circuit of claim 5, in which said network comprises a parallel circuit of a resistance element and a capacitor.

8. A circuit for producing a direct voltage and a current with a sawtooth wave form in a coil comprising an amplifying element having an input and an output circuit, means applying a signal to said input circuit for periodically rendering said amplifying device conductive, said output circuit comprising a transformer having a primary and a secondary winding, means connecting said coil to an end of said primary winding, means connecting one end of said primary winding to a source of voltage and the other end of said primary winding to an output electrode of said amplifying device, rectifier means connected to one end of said secondary winding for producing a direct voltage, means for effecting variation of the amplitude of said sawtooth current with variation of said direct voltage such that the relative variation of said amplitude is approximately half of the relative variation of said direct voltage, the internal resistance $R_p$ of said amplifying element, the impedance $Z_d$ of said coil transferred to said other end of said primary winding, and the internal impedance $Z_s/n^2$ of the secondary side of said transformer transferred to the primary side, being related as follows:

$$\frac{Z_d R_p}{Z_d + R_p} = \frac{Z_s}{n^2}$$

where $n$ is the transformation ratio of said transformer, a negative feedback circuit, means coupling the input of said feedback circuit to the primary winding of said transformer, and means coupling the output of said feedback circuit to the input circuit of said amplifying element.

References Cited in the file of this patent

UNITED STATES PATENTS

| | | |
|---|---|---|
| 2,579,627 | Tourshou | Dec. 25, 1951 |
| 2,584,213 | Longo et al. | Feb. 5, 1952 |
| 2,697,798 | Schlesinger | Dec. 21, 1954 |
| 2,712,092 | Schwarz | June 28, 1955 |
| 2,712,616 | Leeds | July 5, 1955 |
| 2,729,766 | Vilkamerson | Jan. 3, 1956 |
| 2,740,070 | Ogletree | Mar. 27, 1956 |
| 2,743,382 | Lufkin | Apr. 24, 1956 |
| 2,751,520 | Nelson | June 19, 1956 |
| 2,790,108 | Bigelow | Apr. 23, 1957 |
| 2,810,093 | Deal | Oct. 15, 1957 |
| 2,856,560 | Sanford | Oct. 14, 1958 |
| 2,872,616 | Stone | Feb. 3, 1959 |